J. L. TOWNSEND.
FERTILIZER DISTRIBUTING APPARATUS.
APPLICATION FILED APR. 18, 1919.
1,313,653.
Patented Aug. 19, 1919.
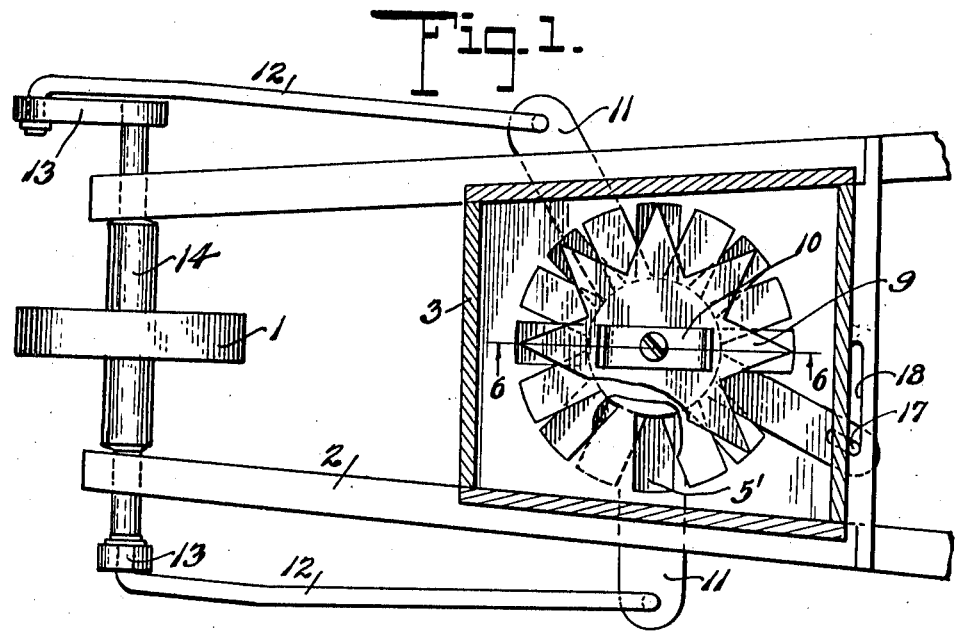
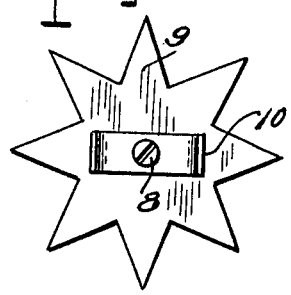
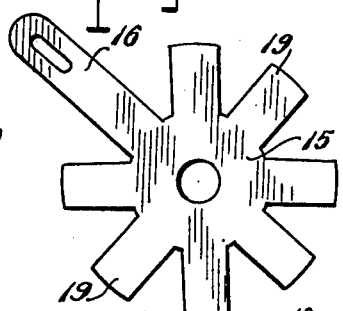
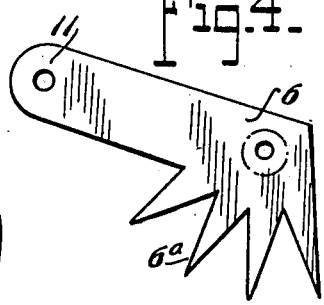
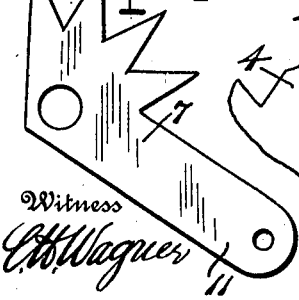
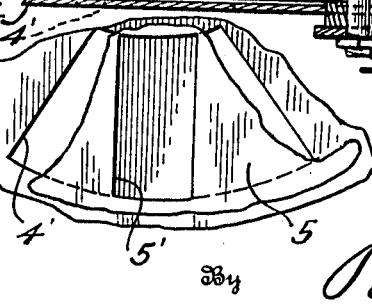
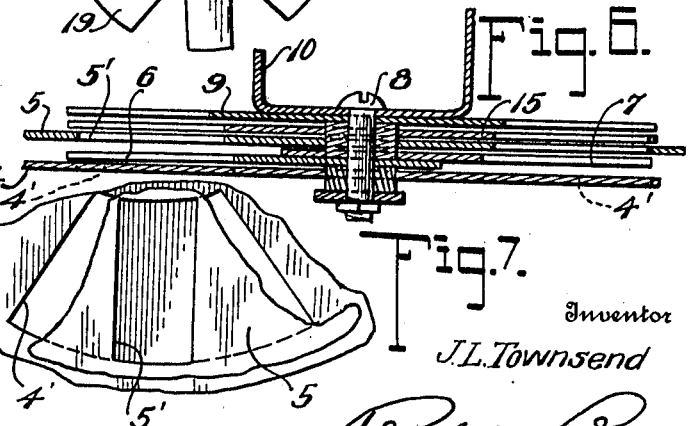
Inventor
J. L. Townsend
By Robert Cobb
Attorney
Witness
C. H. Wagner

UNITED STATES PATENT OFFICE.

JAMES L. TOWNSEND, OF MANQUIN, VIRGINIA.

FERTILIZER-DISTRIBUTING APPARATUS.

1,313,653. Specification of Letters Patent. Patented Aug. 19, 1919.

Application filed April 18, 1919. Serial No. 291,062.

*To all whom it may concern:*

Be it known that I, JAMES L. TOWNSEND, a citizen of the United States, residing at Manquin, in the county of King William and State of Virginia, have invented certain new and useful Improvements in Fertilizer-Distributing Apparatus, of which the following is a specification.

The present invention relates to improvements in agricultural implements of the type disclosed in my previous Patent No. 1,213,711, granted January 23, 1917, designed for distributing fertilizer or similar materials.

In the apparatus of the previous patent I have discovered some defects which it is the aim of the present improvements to overcome. In this device the fertilizer contained in a suitable hopper is dispensed from the same by means of an oscillatory plate actuated by a crank connection with the ground wheel, but I find that this arrangement led to an uneven distribution of the material, caused by the variation in the movement of the plate as an incident to the comparatively slow action of the agitator at the end of each stroke. I obtain, on the other hand, in my present apparatus an entirely consistent and satisfactory result by employing a distributing plate of sectional form, each element of which is provided with its own crank connection so set in relation to each other that when one of the sections is moving at its maximum rate, the other is passing over dead center at its minimum rate of movement.

These and such other objects and advantages as may hereinafter appear are attained by the novel construction, combination and arrangement of parts to be hereinafter specifically described and claimed. Reference will now be had to the accompanying drawings forming a part of this specification, wherein:

Figure 1 is a fragmentary sectional view of an apparatus embodying the present invention.

Fig. 2 is a plan view of one of the distributing elements.

Fig. 3 is a plan view of the adjustable cut-off plate.

Figs. 4 and 5 are plan views of the sections of the distributing plate.

Fig. 6 is a sectional view somewhat enlarged taken about on the plane indicated on line 6—6 of Fig. 1; and Fig. 7 is a fragmentary view of the closure plates showing the staggered relation of the openings therein.

Throughout the following detail description and on the several figures of the drawings, similar parts are referred to by like reference characters.

The fertilizer distributing apparatus comprehended herein is of the hand steered type more particularly disclosed in my previous patent above referred to and since the general details of construction are not essential to the objects of this invention the apparatus is only generally illustrated in Fig. 1. 1 designates the ground wheel, 2 the frame, and 3 the hopper mounted on said frame in which the fertilizing material is disposed for distribution. The bottom of this hopper is closed substantially by two plates, the lower designated 4 and the upper designated 5, spaced somewhat apart so as to receive therebetween, what I term for the purpose of this description, the distributing means of this apparatus. The said means consists of the two members illustrated in Figs. 4 and 5, one designated 6 and the other designated 7, each mounted about the axis 8. The member 7 is loosely mounted about the central axis while the member 6 is fixed for movement with said axis and attached for movement with said axis, also just above the upper closure plate 5 is a star shaped plate 9 fixed for movement with said axis. This last mentioned plate has attached thereto by means of the axis 8 referred to, a U-shaped element 10 and the function of the parts 9 and 10 may be said to break up the lumps which are customarily found in fertilizing materials, so that the material will pass through the upper closure plate in comparatively fine condition to be acted upon by the distributing means between the closure plates. These last mentioned plates are each provided with radially arranged openings or slots 4' and 5', the latter being arranged in staggered relation to the former so that no direct opening in the bottom of the hopper is provided by these plates. In fact, the only way the material will issue from the hopper is through the action of the distributing means 6, 7, the fingers 6ª and 7ª of which shove the material back and forth until it drops through the bottom closure plate onto the ground. The segments or members 6 and 7 are each provided with an extension arm, designated 11 which projects laterally from the apparatus and is connected by a rod 12 to a crank arm 13 on the axis 14 of the wheel 1. Previous to describing the operation it should be mentioned that between the star shaped plate 9 and the upper closure plate 5, I arrange a cut-off plate 15 having an arm 16 projecting rearwardly so as to extend to a convenient point of access to receive a clamping bolt 17 arranged in a slot 18. This cut-off is provided with radial fingers 19 which are so arranged that they will coincide more or less with the openings 5' in the upper closure plate 5 so as to control the amount of fertilizer which is allowed to pass from the hopper.

In the operation of the apparatus over the surface of the ground upon which the fertilizer is to be distributed, the ground wheel 1 will cause the members 6 and 7 of the distributing element to be oscillated. At the same time the lump breaker elements 9 and 10 which are fixed for movement with one of these distributing parts are likewise agitated to break up the material so that it will pass through the upper closure plate in the manner described. The crank arms 13 being set at right angles to each other when one of the same is passing through "dead center" and necessarily the motion of the segment of the distributing means is slowest, the other crank arm is shifting the other of said segments of the distributing means at the normal rate of movement, so that there is a constant agitation and distribution of the material which conduces to a steady even flow from the apparatus. This is the particular result which I have striven to obtain by these improvements. The quantity of the distribution is, of course, controllable by the adjustment of the cut-off plate 15. The apparatus constructed in accordance with the above is simple in its arrangement but effective in accomplishing the result stated.

Having thus described my invention, what I claim as new is:

1. Fertilizer distributing apparatus of the class described comprising a hopper, spaced closure plates arranged at the bottom of said hopper each having openings, the openings of one arranged in staggered relation to the openings of the other, distributing means arranged between the plates comprising a pair of agitating plates operable independently, and a crank connection for each of said plates to provide for oscillation thereof to effect distribution of the material in the hopper.

2. Fertilizer distributing apparatus of the class described comprising a hopper, spaced closure plates arranged at the bottom of said hopper and provided with radially arranged openings, the openings of one plate being arranged in staggered relation to the openings of the other, agitating means disposed between the plates and comprising a pair of members each having an arm extending outwardly from the hopper, and a crank shaft connection for each arm, a cut-off member arranged at the bottom of said hopper, and adjustable with respect to the openings of one of the closure plates to control the amount of material to be distributed by the distributing means.

3. In fertilizer distributing means of the class described, a hopper, spaced closure plates arranged on the base of the hopper and having openings through which the material is permitted to pass, a cut-off plate for controlling the passage of the material through said openings, distributing means arranged between the plates and comprising a pair of oscillatory members, a crank arm for each of said oscillatory members, and means for breaking up the lumps of said material comprising a plate arranged adjacent to the closure plates and connected with one of the oscillatory members aforesaid for movement therewith.

In testimony whereof I affix my signature.

JAMES L. TOWNSEND.